United States Patent [19]

Mizuno et al.

[11] Patent Number: 4,991,951
[45] Date of Patent: Feb. 12, 1991

[54] EYEGLASS FRAME FOR ELECTROOPTICAL LENSES

[75] Inventors: Mitsuyoshi Mizuno, Matsudo; Tatsuo Niwa, Sakura, both of Japan

[73] Assignee: Nikon Corporation, Tokyo, Japan

[21] Appl. No.: 501,026

[22] Filed: Mar. 29, 1990

[30] Foreign Application Priority Data

Apr. 7, 1989 [JP] Japan ................................. 1-86990

[51] Int. Cl.⁵ .............................................. G02C 7/10
[52] U.S. Cl. ........................................ 351/41; 351/44; 351/158
[58] Field of Search ....................... 350/331 R, 331 V; 351/41, 44, 49, 158

[56] References Cited

U.S. PATENT DOCUMENTS 3,245,315  4/1966  Marks et al. .......................... 351/49
4,300,818  11/1981  Schachar .............................. 351/41

FOREIGN PATENT DOCUMENTS 52-54455 of 1977  Japan.
1563929 of 1980  United Kingdom.

Primary Examiner—Paul M. Dzierzynski
Attorney, Agent, or Firm—Shapiro and Shapiro

[57] ABSTRACT

An eyeglass frame for supporting an optical member having an electrooptical device and a pair of electrodes exposed in different peripheral positions, comprises a front part providing a rim for supporting the optical member, the front part including first and second front members which constitute different parts of the rim, are composed of conductive metal and are mutually insulated electrically, wherein the first front member is in contact with a first peripheral part including one of the paired electrodes of the optical member while the second front member is in contact with a second peripheral part including the other of the paired electrodes, and the eyeglass frame comprises an electric power source for applying a voltage between the first and second front members, for electric supply to the electrooptical device.

8 Claims, 2 Drawing Sheets

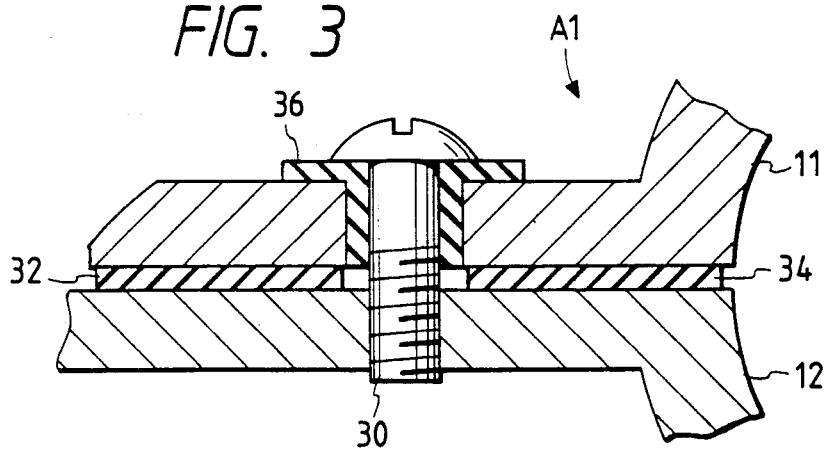
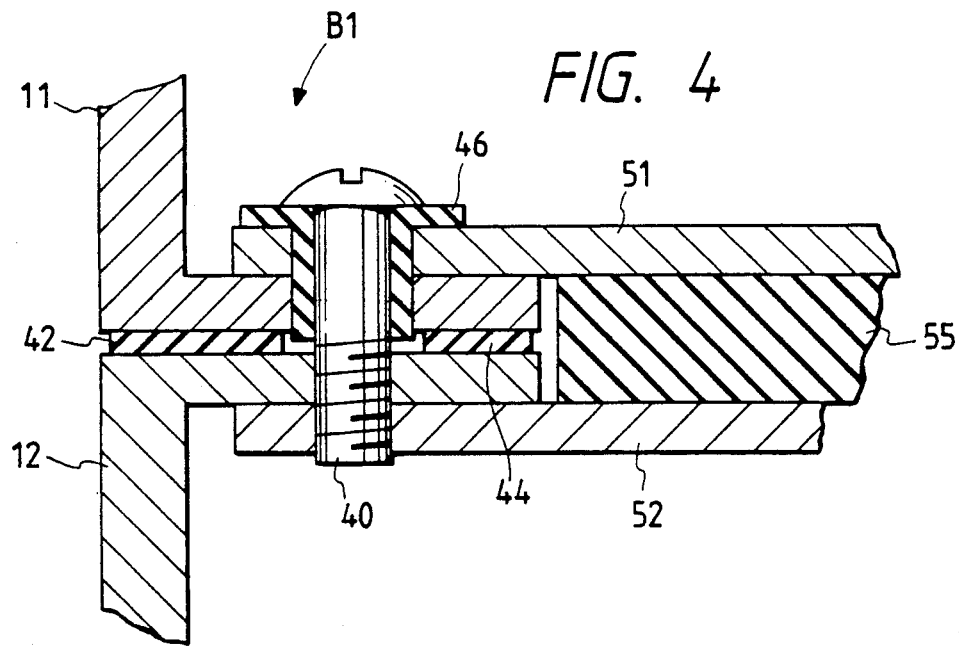

EYEGLASS FRAME FOR ELECTROOPTICAL LENSES

BACKGROUND OF THE INVENTION

1. Field of the Invention

The present invention relates to a metal eyeglass frame for supporting lenses with electrooptical devices.

2. Related Background Art

There are recently proposed eyeglasses employing lenses equipped, on the surface or interior thereof, with an electrooptical device such as an electrochromic (EC) device, a liquid crystal device or a transparent heat-generating resistor (antidewing) and modifying the function (for example optical properties) of the lenses by supplying said electrooptical device with electric energy.

As an example, the Japanese Laid-open Patent Application No. 52-54455, corresponding to the British Pat. No. 1,563,929, discloses eyeglasses in which an electrochromic device is formed on the lens by laminating, in succession, a transparent electrode (cathode) layer, a tungsten trioxide ($WO_3$) layer, an insulating layer such as of silicon dioxide, and a transparent electrode (anode) layer. The $WO_3$ layer is colored blue by the application of a voltage to said electrochromic device, and is made colorless again by the application of an inverse voltage. The phenomenon of this coloration and discoloration is not yet clarified in detail, but is understood to be governed by a trace amount of water contained in the $WO_3$ layer and in the insulating (ion conductive) layer.

The electric terminals of the lens equipped with such electrooptical device and provided at the external periphery of the lens in order not to disturb the viewing field of the user, and are directly connected, for example by soldering, to lead wires of which the other ends are connected to a power supply unit, for constituting an electric supply path for the electrooptical device in such eyeglasses. Also at the assembling of eyeglasses, the lenses having such lead wires are fitted into a frame.

SUMMARY OF THE INVENTION

An object of the present invention is to provide a metal eyeglass frame adapted for use in combination with lenses equipped with electrooptical devices.

Another object of the present invention is to provide a metal eyeglass frame allowing to simplify the electric feeding structure for the electrooptical devices of the lenses and reducing the limitation in designing.

The electrooptical devices considered in the present invention include devices varying the optical characteristics in response to an electric energy such as an electrochromic (EC) device or a liquid crystal device, and a device for converting the electric energy into another energy thereby causing a change in the optical properties of the lens, such as a heat-generating resistor for preventing the dewing of the lens.

In the frame of the present invention, the front part is divided into an upper member and a lower member which are both composed of conductive metal and are mutually insulated. A pair of optical components of glass or plastic material, such as lenses, mounted in a pair of rims of said frame, are respectively provided with the electro-optical devices explained above, and are respectively provided with electrodes in the edge portions corresponding to the upper and lower members of the front part. By connecting said upper and lower members to an electric power source through a switch, the current supplied for example through the upper member enters the electrooptical device through an electrode of the lens, and flows out therefrom through the other electrode and the lower member.

Thus, according to the present invention, the metal frame itself is utilized as the supply path for the electric energy, so that the power supply path to the electrooptical device can be formed merely by fitting the lens into the frame, without particular process for electric connection.

In a preferred embodiment of the present invention, the temple part of the frame is also divided into an upper member and a lower member, which are both composed of conductive metal and are respectively connected electrically to the upper and lower members of the front part. Thus an electric power source and other components such as a switch, provided at an end of the temple part, can be electrically connected to the electrooptical devices through the metal frame itself.

BRIEF DESCRIPTION OF THE DRAWINGS

FIG. 3 is a cross-sectional view of coupling structure of a dividing part A1 in FIG. 1; and FIG. 4 is a cross-sectional view of coupling structure of a dividing part B1 in FIG. 1.

DESCRIPTION OF THE PREFERRED EMBODIMENT

Figure 1:
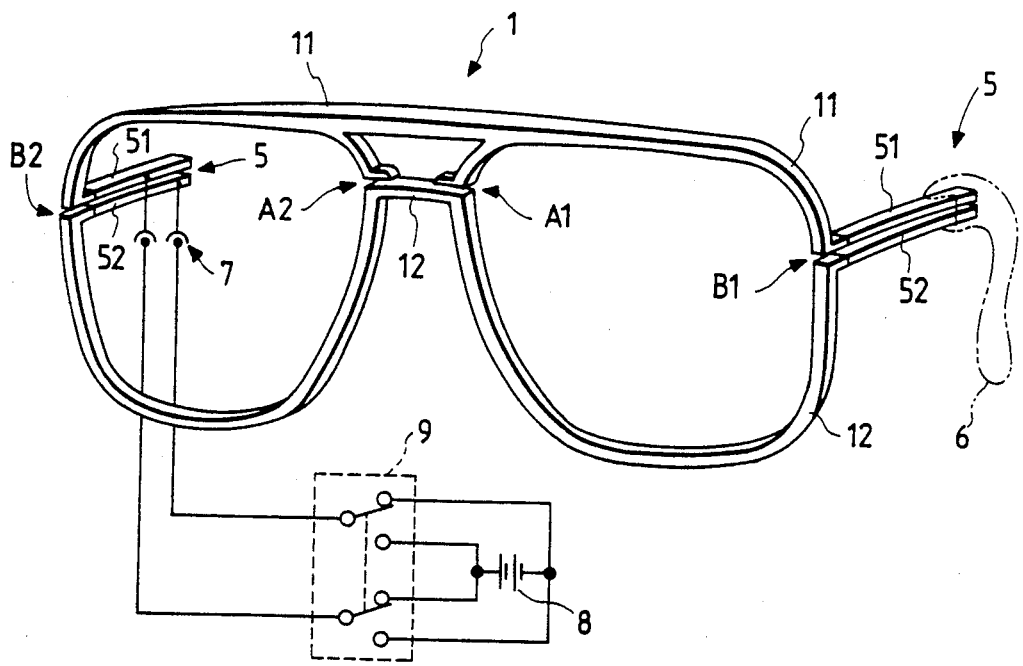
FIG. 1 is a perspective view of an eyeglass frame constituting an embodiment of the present invention.

Referring to FIG. 1, a front part 1 constituting a pair of rims is composed of conductive metal material, and is divided into an upper member 11 constituting the upper halves of said rims and a lower member 12 constituting the lower halves. Thus the front part 1 contains four dividing parts A1, A2, B1, B2, at each of which the upper member 11 and the lower member 12 are coupled in mutually insulated state.

A pair of temple parts 5, provided on both sides of the front part 1, are composed of conductive metal material, and are respectively divided into upper members 51 constituting the upper half and lower members 52 constituting the lower half. The upper and lower members of the temple part are also mutually insulated, and an ear hook 6 of plastic material is attached by molding to an end of said temple part.

The upper and lower members of the front part are mutually connected as will be explained in the following, at two dividing parts A1, A2 positioned at the center of the front part.

FIG. 3 shows the connecting structure at the dividing part A1, but a same structure is also provided at A2. At said part A1, the upper member 11 and the lower member 12 are positioned with a certain gap therebetween, and are mutually fixed by a screw 30. Between the members 11, 12 there are provided spacers 32, 34 composed of electrically insulating resin such as polyvinyl chloride or polypropylene, and the upper part 11 and the screw 30 are electrically insulated by an insulating spacer 36.

Furthermore, the upper and lower members are connected as will be explained in the following, at the two dividing parts B1, B2 positioned on both sides of the front part.

FIG. 4 shows the connecting structure at the dividing part B1, but a same structure is also provided at B2. At said part B1, the upper member 11 and the lower member 12 are positioned with a certain gap therebetween, and are mutually fixed by a screw 40. Between the members 11, 12 there are provided spacers 42, 44 composed of resinous material of electrically insulating property as explained above. Also the upper member 11 and the screw 40 are also electrically insulated by an insulating spacer 46.

The upper member 51 and the lower part 52 of the temple part are positioned with a certain gap therebetween, and are electrically insulated by an insulating spacer 55.

On the other hand, an upper end face of the upper member 11 of the front part directly touches a lower end face of the upper member 51 of the temple part, thereby forming electrical connection between the members 11 and 51. Similarly the lower members 12 and 51 are electrically connected.

Figure 2:
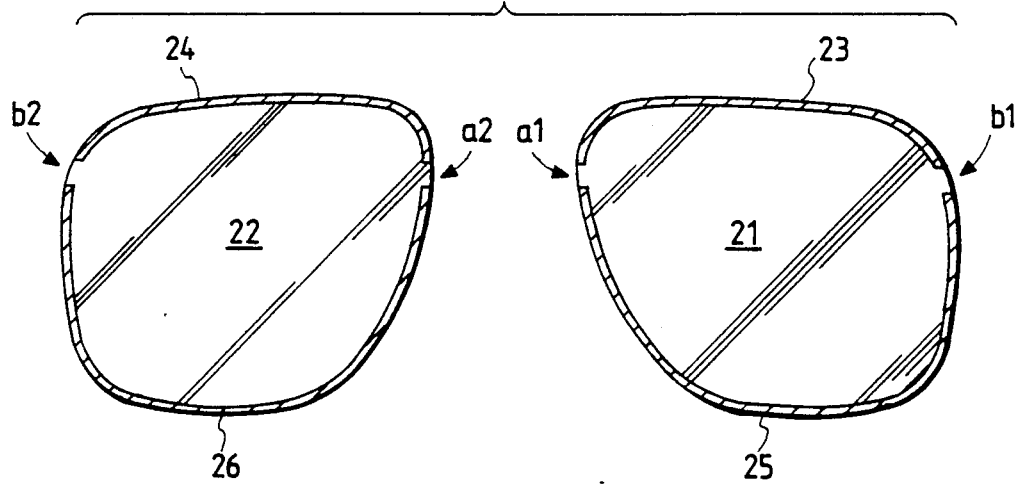
FIG. 2 is a front view of a pair of lenses.

FIG. 2 shows lenses to be fitted in the eyeglass frame of the above-explained structure.

Paired lenses 21, 22 are respectively provided, on a substrate of glass or plastic material, with a known electrooptical device laminated on said substrate and having electrochromic property. At the upper and lower edges of the device 21, there are exposed electrodes 23, 25. Also at the upper and lower edges of the device 22, there are exposed electrodes 24, 26. The gaps a1, b1 between the electrodes 23 and 25 on the lens 21 respectively correspond to the dividing parts A1, B1 of the frame 1, and the gaps a2, b2 between the electrodes 24 and 26 respectively correspond to the dividing parts A2, B2 of the frame 1.

By fitting the lenses 21, 22 respectively in the right and left rims of the frame 1 and closing said rims by the screws at the dividing parts A1, B1, A2, B2, the upper electrodes 23, 24 of two lenses contact the upper member 11 of the frame, while the lower electrodes 25, 26 contact the lower member 12 of the frame.

As shown in FIG. 1, by connecting terminals 7, connected to the upper and lower members of the temple part, to a power supply unit including a power source 8 and a switch 9, a current is supplied through a path 51-11-23/24-21/22-25/26-12-52 by the actuation of said switch 9, whereby the electrooptical devices of the lenses are activated.

We claim:

1. An eyeglass frame for supporting an optical member having an electrooptical device and a pair of electrodes exposed in different peripheral positions, comprising:
    a front part providing a rim for supporting said optical member, said front part including first and second front members which constitute different parts of said rim, are composed of conductive metal and are mutually insulated electrically, wherein said first front member is in contact with a first peripheral part including one of the paired electrodes of said optical member while the second front member is in contact with a second peripheral part including the other of said paired electrodes; and
    means for applying a voltage between said first and second front members, for electric supply to said electrooptical device.

2. An eyeglass frame according to claim 1, wherein said first front member constitutes the upper part of said rim, while said second front member constitutes the lower part of said rim.

3. An eyeglass frame according to claim 1, wherein said optical member includes a pair of optical parts positioned at left and right of said front part, said front part provides left and right rims for supporting said pair of optical parts, and said first and second front members constitute different parts in each of said left and right rims.

4. An eyeglass frame according to claim 1, further comprising a temple part provided at an end of said front part, said temple part including first and second temple members which are respectively connected electrically to said first and second front members, are composed of conductive metal and are mutually insulated eletrically.

5. An eyeglass frame according to claim 4, wherein said voltage applying means is adapted to apply said voltage between said first and second temple members.

6. An eyeglass comprising:
    an optical member having an electrooptical device and a pair of electrodes exposed in different peripheral positions;
    a front part providing a rim for supporting said optical member, said front part including first and second front members which constitute different parts of said rim, are composed of conductive metal and are mutually insulated electrically, wherein said first front member is in contact with a first peripheral part including one of the paired electrodes of said optical member while the second front member is in contact with a second peripheral part including the other of said paired electrodes; and
    means for applying a voltage between said first and second front members, for electric supply to said electrooptical device.

7. An eyeglass according to claim 6, further comprising a temple part provided at an end of said front part, said temple part including first and second temple members which are respectively connected electrically to said first and second front members, are composed of conductive metal and are mutually insulated electrically.

8. An eyeglass according to claim 7, wherein said voltage applying means is adapted to apply said voltage between said first and second temple members.

* * * * *